(12) United States Patent
Fong et al.

(10) Patent No.: US 11,696,210 B2
(45) Date of Patent: Jul. 4, 2023

(54) MULTI-HOP COMMUNICATION TECHNIQUES

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Hua Wang, Basking Ridge, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/198,061

(22) Filed: Mar. 10, 2021

(65) Prior Publication Data

US 2021/0321317 A1    Oct. 14, 2021

Related U.S. Application Data

(60) Provisional application No. 63/007,185, filed on Apr. 8, 2020.

(51) Int. Cl.
| | |
|---|---|
| H04W 40/22 | (2009.01) |
| H04W 72/1273 | (2023.01) |
| H04W 72/1268 | (2023.01) |
| H04W 76/27 | (2018.01) |
| H04W 72/50 | (2023.01) |
| H04W 28/02 | (2009.01) |

(52) U.S. Cl.
CPC ....... *H04W 40/22* (2013.01); *H04W 28/0236* (2013.01); *H04W 72/1268* (2013.01); *H04W 72/1273* (2013.01); *H04W 72/535* (2023.01); *H04W 76/27* (2018.02)

(58) Field of Classification Search
None
See application file for complete search history.

(56) References Cited

U.S. PATENT DOCUMENTS

| | | | |
|---|---|---|---|
| 2013/0041932 A1* | 2/2013 | Moore | H04L 47/32 455/524 |
| 2022/0338219 A1* | 10/2022 | Ding | H04W 72/23 |
| 2022/0338283 A1* | 10/2022 | Wang | H04W 76/20 |

* cited by examiner

*Primary Examiner* — Jutai Kao
(74) *Attorney, Agent, or Firm* — Norton Rose Fulbright US LLP/Qualcomm Incorporated

(57) ABSTRACT

Systems and methods configured for supporting multi-hop communications are described. Embodiments provide unavailable packet signaling by a base station aiding a multi-hop communication link. For example, the base station may transmit a predetermined "unavailable" message (e.g., an explicit and affirmatively transmitted message having predetermined content and/or format transmitted according to the schedule of the failed message) when an uplink data transmission in a multi-hop communication link fails or is otherwise currently unavailable. The unavailable packet signaling may be provided in association with a semi-persistent scheduling (SPS) and control channel scheduled retransmission technique, such as for supporting Internet of things (IoT), such as industrial Internet of things (IIoT), traffic. Other aspects and features are also claimed and described.

26 Claims, 9 Drawing Sheets

FIG. 6A
FIG. 6B
FIG. 6C
FIG. 6D

MULTI-HOP COMMUNICATION TECHNIQUES

CROSS-REFERENCE TO RELATED APPLICATIONS

This application claims the benefit of U.S. Provisional Patent Application No. 63/007,185, entitled, "multi-HOP COMMUNICATION TECHNIQUES," filed on Apr. 8, 2020, which is hereby incorporated by reference herein in its entirety as if fully set forth below and for all applicable purposes.

TECHNICAL FIELD

Aspects of the present disclosure relate generally to wireless communication systems capable of supporting multi-hop communications, and more particularly, to techniques for use in signaling an indication that a packet to be forwarded is currently unavailable in a multi-hop communication. Certain embodiments of the technology discussed below can enable and provide unavailable packet signaling by a base station aiding a multi-hop communication link, such as for supporting industrial Internet of things (IIoT) traffic and/or the like.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

The UEs may comprise various device configurations, such as a mobile wireless device, an Internet of things (IoT) or Internet of everything (IoE) device, etc., and may have particular associated communication needs and/or requirements. For example, latency and reliability requirements for industrial Internet of things (IIoT) traffic are stringent (e.g., latency$\approx$1-2 ms and reliability$\approx$10-5-10-6 block error rate (BLER)). The aforementioned interference presents challenges with respect to some wireless communications meeting needs and/or requirements of the particular wireless devices and situations.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include determining that a scheduled uplink data transmission comprising data to be transmitted from a first wireless device of a multi-hop communication link to a second wireless device of the multi-hop communication link has failed. The method may also include transmitting a message indicating the data is unavailable as a downlink data transmission to the second wireless device.

In an additional aspect of the disclosure, an apparatus configured for wireless communication is provided. The apparatus may include means for determining that a scheduled uplink data transmission comprising data to be transmitted from a first wireless device of a multi-hop communication link to a second wireless device of the multi-hop communication link has failed. The apparatus may also include means for transmitting a message indicating the data is unavailable as a downlink data transmission to the second wireless device.

In an additional aspect of the disclosure, a non-transitory computer-readable medium having program code recorded thereon for wireless communication is provided. The program code may include code to determine that a scheduled uplink data transmission comprising data to be transmitted from a first wireless device of a multi-hop communication link to a second wireless device of the multi-hop communication link has failed. The program code may also include code to transmit a message indicating the data is unavailable as a downlink data transmission to the second wireless device In an additional aspect of the disclosure, an apparatus configured for wireless communication is provided. The apparatus includes at least one processor, and a memory coupled to the processor. The processor may be configured to determine that a scheduled uplink data transmission comprising data to be transmitted from a first wireless device of a multi-hop communication link to a second wireless device of the multi-hop communication link has failed. The processor may also be configured to transmit a message indicating the data is unavailable as a downlink data transmission to the second wireless device.

In accordance with aspects of the disclosure, the foregoing systems, methods, and apparatuses may be implemented in combination with one or more additional features, such as the following features whether alone or in combination. For example, the above systems, methods, and apparatuses may include the determining and the transmitting being performed by a base station. The above systems, methods, and apparatuses may include at least one of the first and second wireless devices being an Internet of things (IoT) device. The above systems, methods, and apparatuses may include one of the first and second wireless devices being an industrial Internet of things (IIoT) device and the other one of the first and second wireless devices comprises an industrial controller, and the industrial control and the IIoT device may be part of an industrial environment control network. The above systems, methods, and apparatuses may include the message being transmitted using downlink resources scheduled for downlink transmission of the data from the failed scheduled uplink data transmission. The above systems, methods, and apparatuses may include the message being configured so as to be different from a set of other valid messages transmitted to the second wireless device. The above systems, methods, and apparatuses may include the message being configured to avoid decoding ambiguity at the second wireless device. The above systems, methods, and apparatuses may include the message being a message having predetermined content and format. The above systems, methods, and apparatuses may include a configuration of the message being established at the second wireless device through radio resource control (RRC) signaling. The above systems, methods, and apparatuses may include the scheduled uplink data transmission being a semi-persistent scheduling (SPS) scheduled uplink transmission. The above systems, methods, and apparatuses may include the scheduled uplink data transmission being a first transmission of the data by the first wireless device. The above systems, methods, and apparatuses may include the message being transmitted using a SPS scheduled downlink transmission corresponding to the SPS scheduled uplink transmission. The above systems, methods, and apparatuses may include the scheduled uplink data transmission being a control channel scheduled uplink transmission. The above systems, methods, and apparatuses may include the control channel being a physical downlink control channel (PDCCH). The above systems, methods, and apparatuses may include the scheduled uplink data transmission being a retransmission of the data by the first wireless device, wherein a first transmission of the data using a SPS scheduled uplink transmission by the first wireless device was determined to have failed and a message was transmitted to the second wireless device indicating the data of the SPS scheduled uplink transmission was unavailable. The above systems, methods, and apparatuses may include the message being transmitted using a control channel scheduled downlink transmission corresponding to the control channel scheduled uplink transmission. The above systems, methods, and apparatuses may include scheduling retransmission of the data using control channel signaling to the first and second wireless devices. The above systems, methods, and apparatuses may include the control channel being a PDCCH. The above systems, methods, and apparatuses may include determining that a scheduled uplink data retransmission, according to the control channel scheduling, from the first wireless device has failed and transmitting a second message as a downlink data transmission to the second wireless device, wherein the second message is transmitted using a control channel scheduled downlink transmission corresponding to the control channel scheduled uplink transmission.

In one aspect of the disclosure, a method of wireless communication is provided. The method may include receiving, by a second wireless device of a multi-hop communication link, a message indicating data from a first wireless device of the multi-hop communication link to be transmitted as a scheduled downlink data transmission to the second wireless device is unavailable. The method may also include decoding, by the second wireless device, the message and taking one or more actions, by the second wireless device, based at least in part upon the decoded message.

In an additional aspect of the disclosure, an apparatus configured for wireless communication is provided. The apparatus may include means for receiving, by a second wireless device of a multi-hop communication link, a message indicating data from a first wireless device of the multi-hop communication link to be transmitted as a scheduled downlink data transmission to the second wireless device is unavailable. The apparatus may also include means for decoding, by the second wireless device, the message and means for taking one or more actions, by the second wireless device, based at least in part upon the decoded message.

In an additional aspect of the disclosure, a non-transitory computer-readable medium having program code recorded thereon for wireless communication is provided. The program code may include code to receive, by a second wireless device of a multi-hop communication link, a message indicating data from a first wireless device of the multi-hop communication link to be transmitted as a scheduled downlink data transmission to the second wireless device is unavailable. The program code may also include code to decode, by the second wireless device, the message and code to take one or more actions, by the second wireless device, based at least in part upon the decoded message.

In an additional aspect of the disclosure, an apparatus configured for wireless communication is provided. The apparatus includes at least one processor, and a memory coupled to the processor. The processor may be configured to receive, by a second wireless device of a multi-hop communication link, a message indicating data from a first wireless device of the multi-hop communication link to be transmitted as a scheduled downlink data transmission to the second wireless device is unavailable. The processor may also be configured to decode, by the second wireless device, the message and to take one or more actions, by the second wireless device, based at least in part upon the decoded message.

In accordance with aspects of the disclosure, the foregoing systems, methods, and apparatuses may be implemented in combination with one or more additional features, such as the following features whether alone or in combination. For example, the above systems, methods, and apparatuses may include the U-message being received from a base station. The above systems, methods, and apparatuses may include at least one of the first and second wireless devices being an IoT device. The above systems, methods, and apparatuses may include one of the first and second wireless devices being an IIoT device and the other one of the first and second wireless devices being an industrial controller, and the industrial control and the IIoT device may be part of an industrial environment control network. The above systems, methods, and apparatuses may include the message being received using downlink resources scheduled for downlink transmission of the data corresponding to a scheduled uplink data transmission that failed. The above systems, methods, and apparatuses may include the message being configured so as to be different from a set of other valid messages received by the second wireless device. The above systems, methods, and apparatuses may include the message being configured to avoid decoding ambiguity by the second wireless device. The above systems, methods, and apparatuses may include the message being a message having predetermined content and format. The above systems, methods, and apparatuses may include a configuration of the message being established at the second wireless device through RRC signaling. The above systems, methods, and apparatuses may include the taking one or more actions based at least in part upon the message including determining that downlink error for a downlink of the multi-hop communication link is not a cause of the data being unavailable and maintaining a data rate for the downlink. The above systems, methods, and apparatuses may include the taking one or more actions based at least in part upon the message including performing channel estimation for a downlink of the multi-hop communication link using the message. The above systems, methods, and apparatuses may include the scheduled downlink data transmission being a SPS scheduled downlink transmission. The above systems, methods, and apparatuses may include a scheduled uplink data transmission corresponding to the scheduled downlink data transmission including a first transmission of the data by the first wireless device. The above systems, methods, and apparatuses may include the message being transmitted using the SPS scheduled downlink transmission corresponding to a SPS scheduled uplink transmission for transmission of the data from the first wireless device. The above systems, methods, and apparatuses may include the scheduled downlink data transmission including a control channel scheduled downlink transmission. The above systems, methods, and apparatuses may include the control channel being a PDCCH. The above systems, methods, and apparatuses may include a scheduled uplink data transmission corresponding to the scheduled downlink data transmission including a retransmission of the data by the first wireless device, wherein a first transmission of the data using a SPS scheduled uplink transmission by the first wireless device failed and a first message was received by the second wireless device indicating the data of the SPS scheduled uplink transmission was unavailable. The above systems, methods, and apparatuses may include the message being received using the control channel scheduled downlink transmission corresponding to a control channel scheduled uplink transmission from the first wireless device. The above systems, methods, and apparatuses may include receiving control channel signaling comprising scheduling information for retransmission of the data. The above systems, methods, and apparatuses may include the control channel being a PDCCH. The above systems, methods, and apparatuses may include receiving, by the second wireless device, a second message as a downlink data transmission using a control channel scheduled downlink transmission corresponding to a control channel scheduled uplink transmission of a scheduled uplink data retransmission of the data.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6A illustrates SPS-scheduled first transmissions in an uplink of a multi-hop communication link according to some embodiments of the present disclosure.

FIG. 6B illustrates control channel-scheduled retransmissions in an uplink of a multi-hop communication link according to some embodiments of the present disclosure.

FIG. 6C illustrates SPS-scheduled first transmissions in a downlink of a multi-hop communication link according to some embodiments of the present disclosure.

FIG. 6D illustrates control channel-scheduled retransmissions in a downlink of a multi-hop communication link according to some embodiments of the present disclosure.

DETAILED DESCRIPTION

Figure 1:
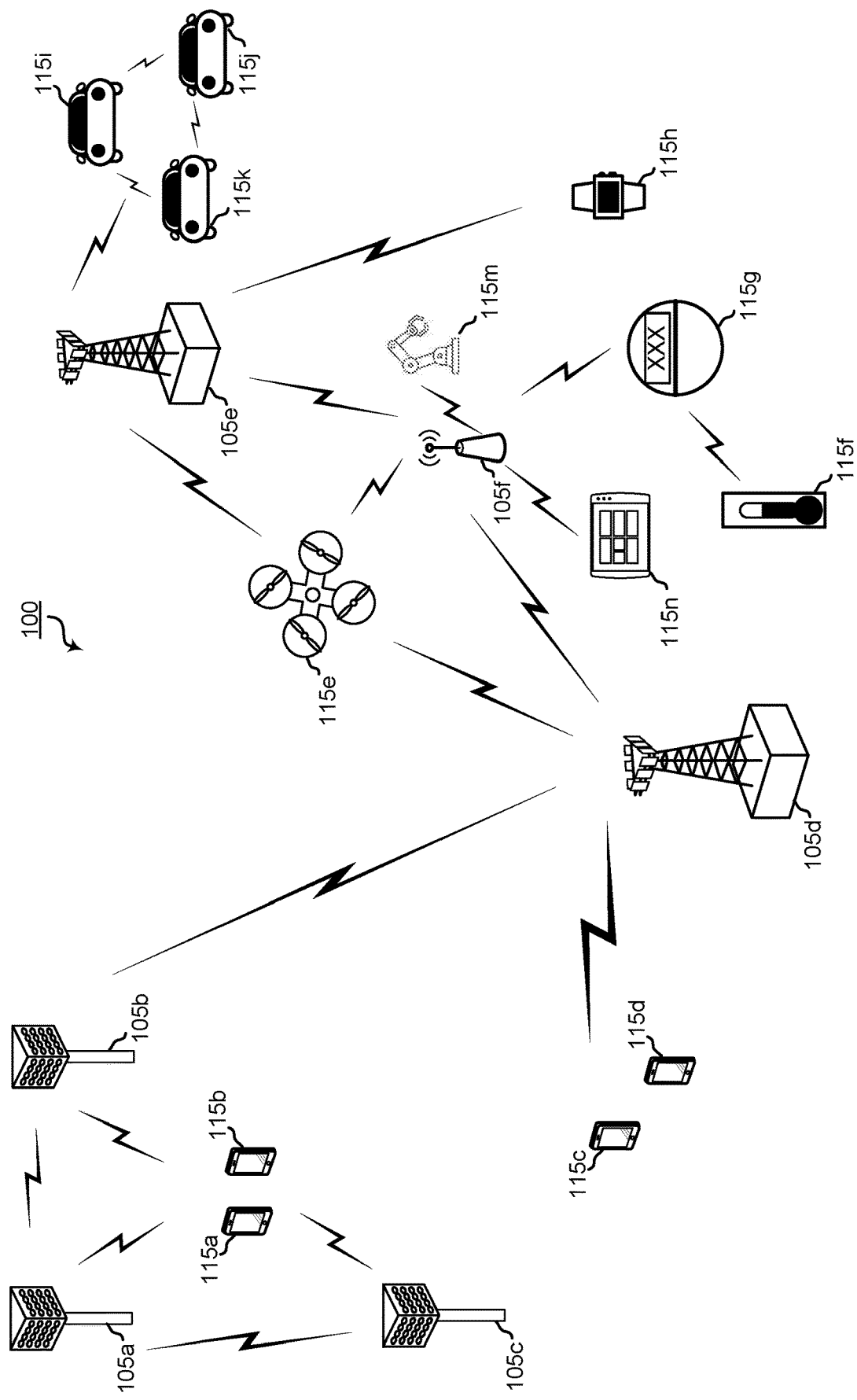
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoT) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an Internet of things (IoT) or Internet of everything (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), UE 115h (wearable device), UE 115m (robotic actuator), and UE 115n (industrial controller) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
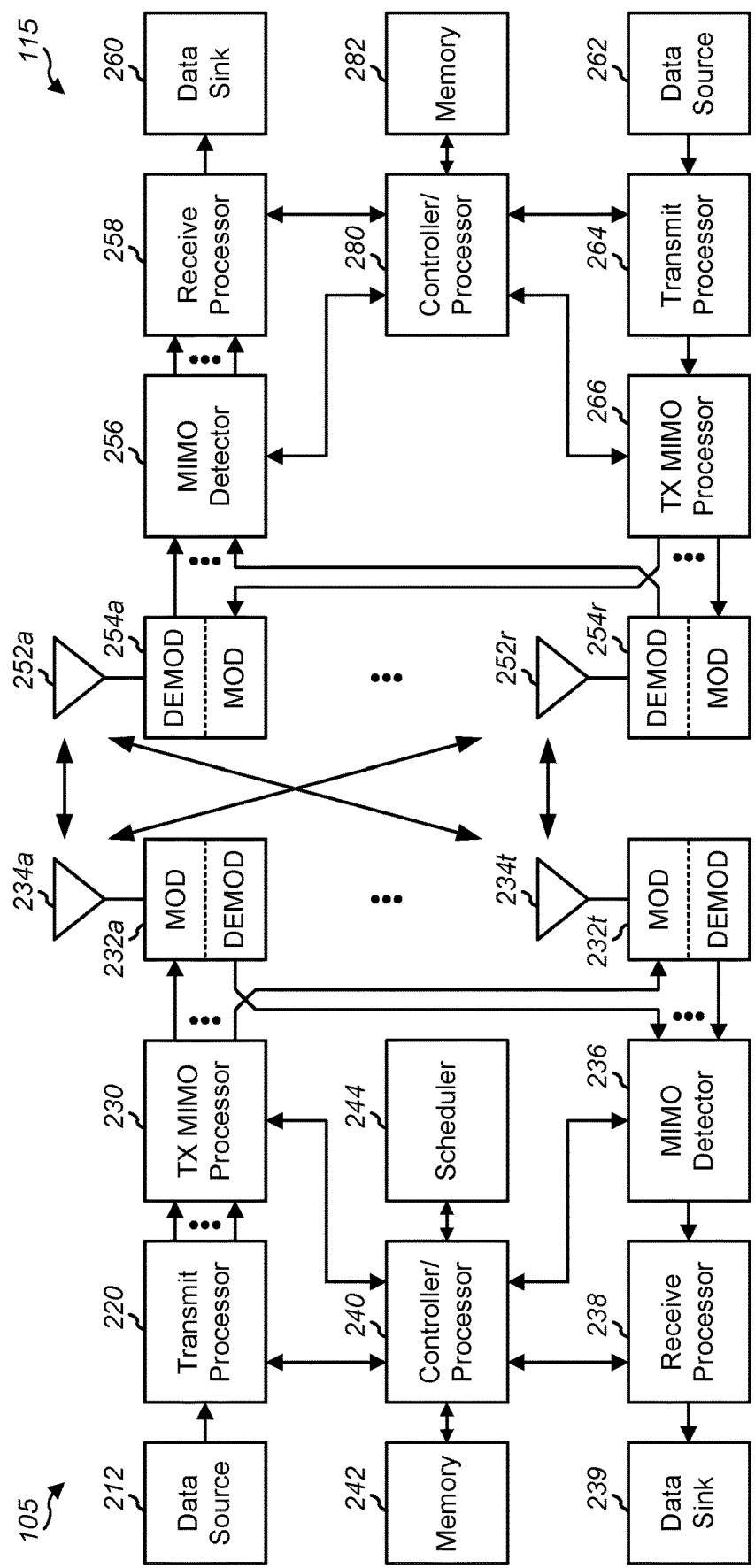
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 8 and 9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In an example implementation of wireless network 100, one or more of UEs 115 may comprise various forms of IoT devices, such as industrial Internet of things (IIoT) devices, in communication via wireless links of wireless network 100. For example, the IIoT devices of some deployments may comprise sensors (e.g., position sensors, temperature sensors, pressure sensors, power sensors, motion detectors, proximity detectors, accelerometers, scanners, cameras, probes, switches, etc.) and/or actuators (e.g., linear actuators, rotary actuators, servomechanisms, solenoids, stepper motors, electric motors, comb drive actuators, etc.). A large number of IIoT devices may be in communication with a corresponding device, such as an industrial controller (e.g., computer, programmable logic controller (PLC), supervisory control and data acquisition (SCADA) system, etc.), of control network in an industrial environment, such as a manufacturing facility, materials processing facility, warehouse, etc.

Figure 3:
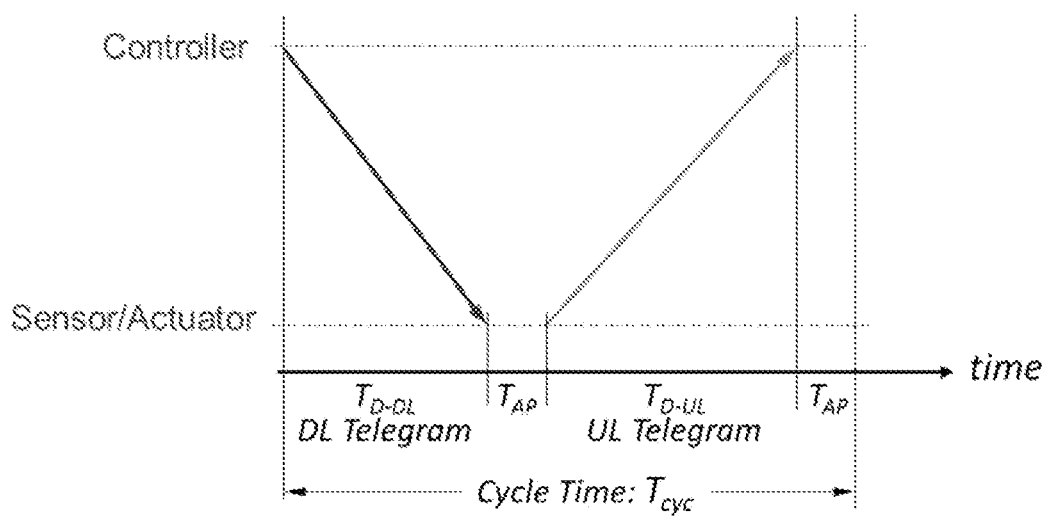
FIG. 3 is a diagram illustrating the deterministic and periodic nature of industrial Internet of things (IIoT) traffic.

The various IIoT devices of an industrial environment control network may periodically communicate information (e.g., measurements, state information, command acknowledgments, etc.) to and/or receive information (e.g., commands, parameters, settings, state information, etc.) from an associated industrial controller. For example, cyclic exchanges may be performed between an industrial controller and a large number of IIoT devices of a control network. Accordingly, the IIoT traffic may be deterministic and periodic, as represented in the diagram of FIG. 3.

Latency and reliability requirements for IIoT traffic are often stringent since output results typically must be produced in response to input conditions within a limited time to avoid unintended, and even dangerous, operation of an industrial process. For example, latency requirements of IIoT traffic may be on the order of 1-2 ms and the reliability requirements may be on the order of 10-5-10-6 block error rate (BLER). Accordingly, both data and control channels of an industrial environment control network may be designed to meet these overall requirements.

Control networks in industrial environments have traditionally utilized wireline communication links. For example, IIoT devices may be in communication with a corresponding industrial controller using wired network links, such as 100 base T Ethernet links. Such a control network may be quite complicated with respect to establishing and maintaining the network links, reconfiguring the network, etc. For example, the task of reconfiguring a control network including a large number of IIoT devices deployed on a factory floor can be costly in both time and expense.

There is interest in making industrial environment control network connectivity wireless. Industrial environment control networks utilizing wireless links may, for example, reduce the time and expense required for reconfiguration of the control network on the factory floor. However, establishing and maintaining reliable wireless links between an industrial controller and the IIoT devices associated therewith can be problematic. For example, the industrial controllers are generally located close to machinery which may cause issues (e.g., shadowing, electrical noise, etc.) in maintaining a reliable and adequate communication link with ones of the many IIoT devices of the control network. Moreover, the latency and reliability requirements for IIoT traffic can prove challenging to meet in a wireless control network implementation.

Figure 4:
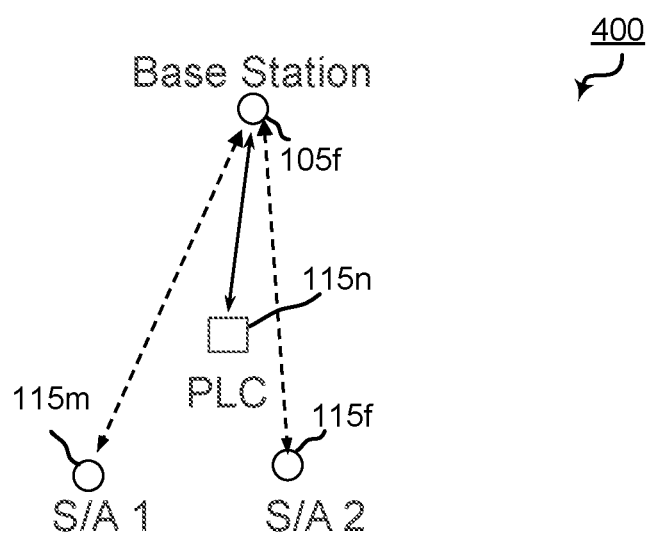
FIG. 4 is a portion of a wireless network forming an industrial environment control network according to some embodiments of the present disclosure.

In accordance with aspects of the present disclosure, one or more base stations are utilized in a control network for aiding a multi-hop communication link between an industrial controller and respective IIoT devices of the control network. For example, one or more base stations 105 of wireless network 100 may be ceiling-mounted, or otherwise disposed (e.g., wall-mounted, mounted atop a pole other structure, etc.), to provide a substantially unobstructed multi-hop path between an industrial controller and some or all IIoT devices of a control network. The example of FIG. 4 shows a portion of wireless network 100 forming industrial environment control network 400 in which base station 105f (e.g., a small cell base station) is disposed to aid with respect to multi-hop communication links between multiple UEs (shown as UEs 115f, 115m, and 115n) of the control network. For example, UE 115n may comprise a PLC or other industrial controller providing control functionality with respect to a plurality of sensor and actuator IIoT devices, including UEs 115f (e.g., a thermometer) and 115m (e.g., a robotic actuator).

Although the example of FIG. 4 is described above as an industrial environment control network 400 in which base station 105f comprises a small cell configuration, UE 115n comprises a PLC configuration, UE 115f comprises a thermometer sensor configuration, and UE 115m comprises a robotic actuator configuration, the example configuration is merely illustrative of a control network in which concepts of the present disclosure may be applied. It should be appreciated that a control network may comprise various configurations of both base stations (e.g., macro cells, small cells, etc., or combinations thereof), industrial controller UEs, (e.g., computers, PLCs, SCADAs, etc., or combinations thereof), IIoT devices (e.g., position sensors, temperature sensors, pressure sensors, power sensors, motion detectors, proximity detectors, accelerometers, scanners, cameras, probes, switches, linear actuators, rotary actuators, servomechanisms, solenoids, stepper motors, electric motors, comb drive actuators, etc., or combinations thereof). Moreover, although the example of FIG. 4 illustrates a single instance of a base station, a single instance of an industrial controller, and two instances of IIoT devices for simplicity, a control environment in which concepts of the present disclosure may be implemented may comprise different numbers of any or all of the foregoing (e.g., multiple base stations, multiple industrial controllers, and IIoT devices on the order of tens, hundreds, or even thousands).

In the example of FIG. 4, base station 105f facilitates multi-hop wireless communication links between an industrial controller (shown as UE 115n) and each of a plurality of IIoT devices (shown as including UEs 115f and 115m designated as sensor/actuator (S/A) 1 and S/A 2). In this multi-hop configuration, the base station serves as a helper node (e.g., relay) to bypass sidelink communication between the industrial controller and the IIoT devices. For example, in providing for IIoT traffic from the industrial controller to IIoT devices, industrial controller 115n generates packets for the IIoT devices and may send these packets to base station 105f. Base station 105f may then forward each packet to the corresponding one of IIoT devices 115f and 115m. In providing for IIoT traffic from the IIoT devices to the industrial controller, IIoT devices 115f and 115m generate packets and may send them to base station 105f. Base station 105f may then forward the packets to industrial controller 115n.

As discussed above with reference to FIG. 3, the IIoT traffic exchanged between an industrial controller and its corresponding IIoT devices is typically deterministic and periodic. Also as discussed above, low latency communication is expected with respect to the IIoT traffic. Accordingly, a semi-persistent scheduling (SPS) technique may be implemented with respect to IIoT traffic between an IIoT device and a corresponding industrial controller in an attempt to meet a latency goal. "Semi-persistent" scheduling may, for example, be implemented for extended or relatively long periods of time (e.g., remaining applicable for periods of time extending minutes, hours, days, etc., until the occurrence of an event, etc.). SPS techniques, where resources for communication between an industrial controller in associated IIoT devices are scheduled before the actual IIoT traffic occurs, may facilitate low latency wireless communications using minimal overhead that is well suited for the deterministic and periodic nature of IIoT traffic.

Figure 5:
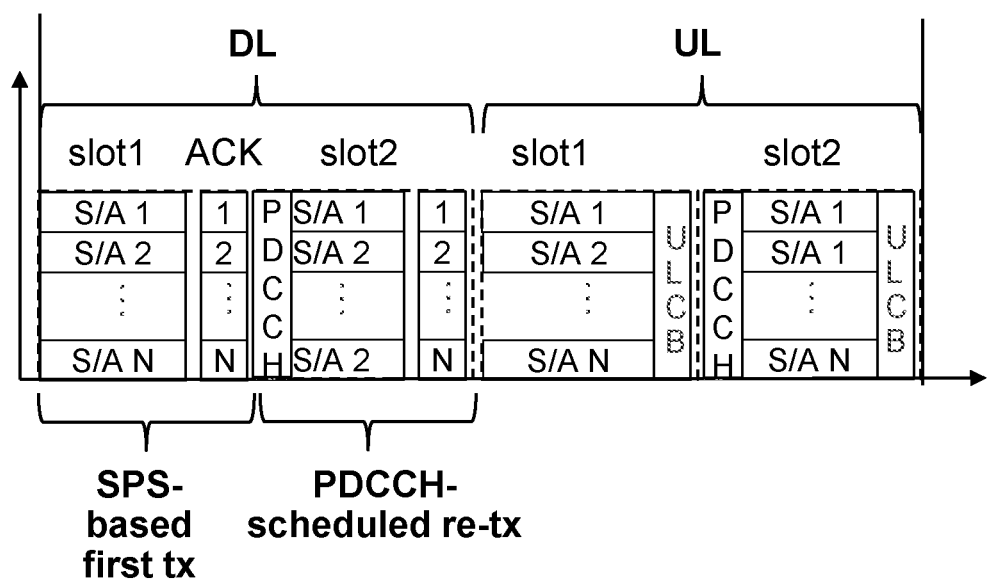
FIG. 5 is an example of scheduling in which semi-persistent scheduling (SPS) is implemented in combination with control channel scheduled retransmissions according to some embodiments of the present disclosure.

As shown in the scheduling example of FIG. 5, SPS may be implemented in combination with control channel scheduled retransmissions for meeting both latency and reliability goals. The scheduling example shown in FIG. 5 provides for SPS-based scheduling for a first transmission of data with respect to IIoT devices (e.g., S/A 1, S/A 2, . . . ). For example, base station 105f may learn the IIoT traffic pattern and set up the scheduling of the SPS, such as using radio resource control (RRC) messaging to establish the SPS with the IIoT devices. Thereafter, the base station may not need to utilize further control messaging with respect to the SPS-scheduled transmissions, except perhaps for alteration of the SPS scheduling from time to time (e.g., as traffic patterns change, IIoT devices are added or removed, etc.). PDCCH scheduled retransmission may be used for missing data of a first SPS-based transmission or data that is otherwise not decodable by an IIoT device, as shown in FIG. 5. Accordingly, control messaging overhead with respect to scheduling may be essentially reduced to that used for ad-hoc scheduling of retransmissions.

Utilization of the foregoing SPS and control channel scheduled retransmission technique in a multi-hop configuration by a base station aiding in the wireless communication between an industrial controller and IIoT devices provides for various traffic scenarios of the multi-hop communications. FIGS. 6A-6D show examples of the multi-hop traffic scenarios associated with implementation of a SPS technique as shown in FIG. 5. In particular, FIGS. 6A and 6B illustrate uplink (e.g., transmissions from the UEs to the base station) traffic scenarios, while FIGS. 6C and 6D illustrate downlink (e.g., transmissions from the base station to the UEs) traffic scenarios.

FIG. 6A illustrates SPS-scheduled first transmissions in the uplink (e.g., scheduled PUSCH resources) and FIG. 6B illustrates corresponding PDCCH-scheduled retransmissions in the uplink (e.g., scheduled PUSCH resources). Similarly, FIG. 6C illustrates SPS-scheduled first transmissions in the downlink (e.g., scheduled PDSCH resources) and FIG. 6D illustrates corresponding PDCCH-scheduled retransmissions in the downlink (e.g., scheduled PDSCH resources). As can be seen in the examples shown in FIGS. 6A-6D, the SPS-scheduled first transmissions have lower reliability compared to PDCCH-scheduled retransmissions (e.g., 10-2 vs. 10-4 BLER). That is, the reliability of the retransmissions is increased to facilitate meeting the IIoT reliability metrics in light of the failed first transmission.

Due to causality (e.g., the base station is relaying transmissions received in the uplink as transmissions in the downlink), the uplink SPS-scheduled first transmissions occur before the corresponding downlink SPS-scheduled first transmissions. In operation according to the above mentioned SPS scheduling technique, an industrial controller (e.g., UE 115n of FIG. 4) or IIoT device (e.g., UEs 115f or 115m) may have been SPS-configured to receive a downlink SPS-scheduled first transmission from the base station (e.g., base station 105f), but the corresponding packet is unavailable to the base station due to packet failures occurring in the corresponding uplink SPS-configured first transmission. Similarly, an industrial controller (UE 115n) or IIoT device (e.g., UEs 115f or 115m) may have been PDCCH-configured to receive a downlink PDCCH scheduled retransmission after a downlink SPS-scheduled first transmission fails, but the corresponding packet is unavailable to the base station due to packet failures occurring in the corresponding uplink PDCCH-configured retransmission.

In accordance with aspects of the present disclosure, techniques for use in signaling an indication that a packet to be forwarded in a multi-hop communication is currently unavailable is provided. A base station aiding a multi-hop communication link may provide such unavailable packet signaling, such as for supporting IoT traffic (e.g., IIoT traffic) or the like. For example, an industrial controller (e.g., UE 115n) or IIoT device (e.g., UEs 115f or 115m) may expect to receive a packet from a base station (e.g., base station 105f) aiding in a multi-hop communication link of a control network. When the base station cannot forward the packet to the corresponding downlink receiver for any reason (e.g., uplink communication failure), the base station operating according to an unavailable packet signaling technique of embodiments herein may transmit a message (also referred to herein as an "unavailable" message or a U-message) to the corresponding downlink receiver (e.g., appropriate one of UEs 115n, 115f, or 115m). Such a message (or U-message) may, for example, be transmitted through PDSCH for an instance of a failed uplink SPS-scheduled first transmission and/or an instance of a failed uplink PDCCH-scheduled retransmission.

A U-message of embodiments may be configured so as to be different from the set of possible messages generated by a sender associated with the receiver. Such different U-message configurations may be utilized according to some aspects of the present disclosure to avoid decoding ambiguity at the receiver as between U-messages and messages of the set of other valid messages that may be received. A U-message may, for example, comprise a predetermined message (e.g., an explicit and affirmatively transmitted message having predetermined content and/or format transmitted according to the schedule of the failed message), such as an all-zero, all-one message, or other predetermined message content and/or pattern. The predetermined message may be configured through RRC according to some embodiments. Alternatively, a base station may provide a "no-show" message in response to a failed uplink transmission, wherein the base station skips the downlink transmission by not transmitting anything (e.g., an implicit message signaled by suppressing transmission of message content according to the schedule of the failed message).

Use of U-messages according to embodiments of the disclosure provide a number of advantages, particularly as compared to a "no-show" message, or similar implicit message. For example, U-messages facilitate better rate adaptation by the receivers. If an expectant receiver decodes a predetermined U-message, channel error is not assumed and the data rate for the link would not be throttled (e.g., adaptive coding and modulation (ACM) decreasing rate adjustment is not implemented). However, if the expectant receiver does not receive any message from the base station, then channel error may incorrectly be assumed and data rate for the link would be throttled (e.g., adaptive coding and modulation (ACM) decreasing rate adjustment is implemented). Moreover, U-messages of embodiments may be utilized for channel estimation, whereas channel estimation cannot be based upon the absence of transmission of a "no-show" message. For example, a receiver expecting a SPS-scheduled transmission may decode the U-message and use the decoded predetermined message for channel estimation and/or other estimation processes.

Figure 7:
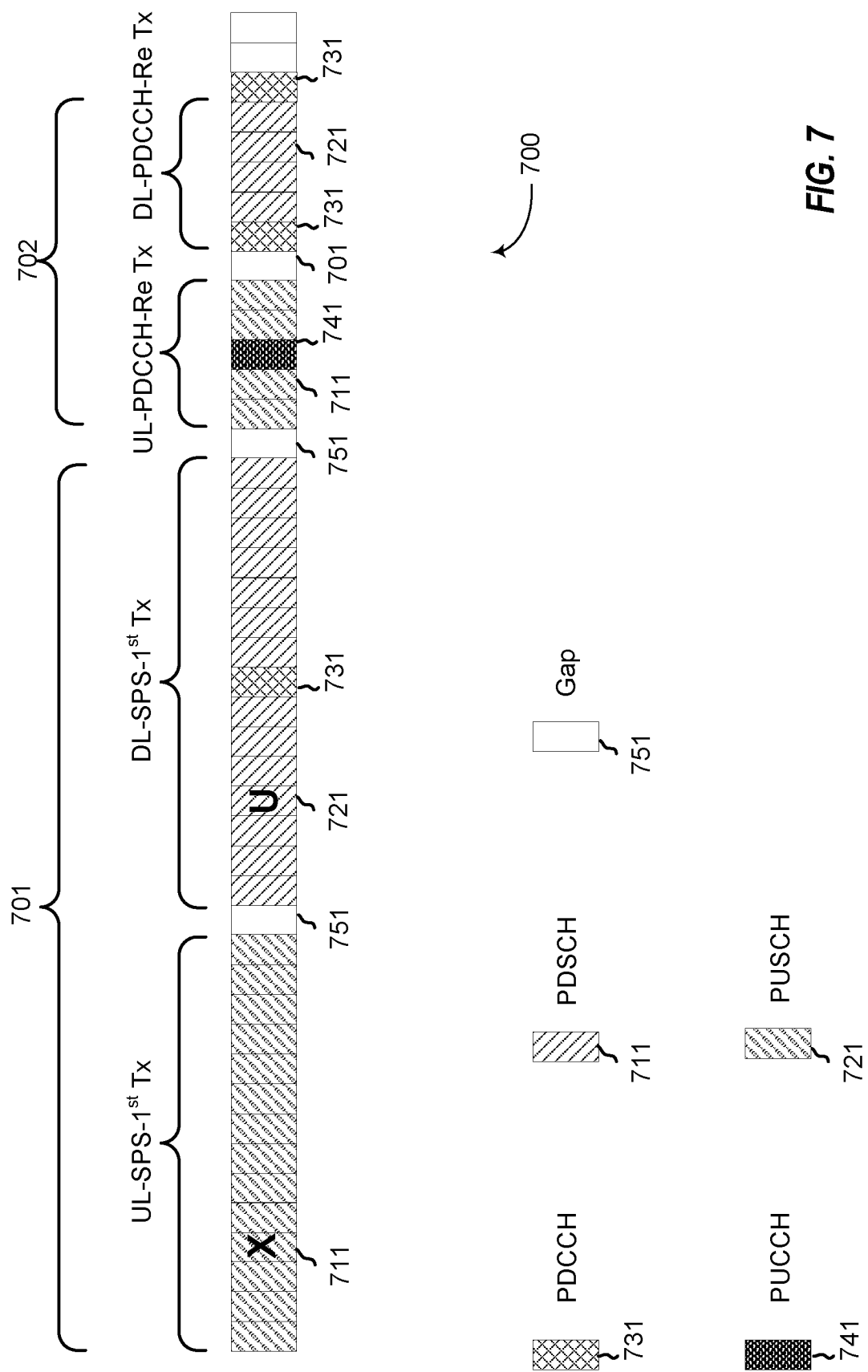
FIG. 7 is an example of a timing diagram for a SPS and control channel scheduled frame according to some embodiments of the present disclosure.

FIG. 7 shows an example of a timing diagram for a SPS and control channel scheduled frame 700, wherein unavailable packet signaling is provided by a base station aiding a multi-hop communication link. SPS and control channel scheduled frame 700 includes SPS-based subframe 701 and PDCCH-based subframe 702. The example illustrated in FIG. 7 includes a relatively short gap (e.g., gap 751), such as may be on the order of 1 ms, between the slots of SPS-based subframe 701 and PDCCH-based subframe 702. One or more such gaps (e.g., gaps 751) may similarly be utilized between instances of SPS and control channel scheduled frame 700. Any or all of above mentioned gaps 751 may, for example, be utilized for a base station and some IIoT devices (e.g., sensors/actuators and corresponding industrial controllers for which the scheduling is provided) in communication therewith to switch between sending and listening modes. SPS and control channel scheduled frame 700 of the illustrated example further includes one or more PDCCH resources (e.g., the instance of PDCCH slot 731 following PDCCH-based subframe 702) available for use in reconfiguring or overriding SPS-scheduling. For example, a base station (e.g., base station 105f of FIG. 4) aiding in the multi-hop communication link may utilize these PDCCH resources to alter the SPS scheduling from time to time (e.g., as traffic patterns change, IIoT devices are added or removed, etc.).

SPS-based subframe 701 of the illustrated example includes SPS-scheduled resources (e.g., PUSCH slots 711 of the uplink SPS first transmission block) for first transmissions in the uplink and corresponding SPS-scheduled resources (e.g., PDSCH slots 721 of the downlink SPS first transmission block) for first transmissions in the downlink. In accordance with some aspects of the disclosure, the uplink SPS-scheduled resources are adjacent, or otherwise in close temporal proximity to, the downlink SPS-scheduled resources, such as to avoid or eliminate gaps introduced by processing delays of the multi-hop communication link. For example, the example illustrated in FIG. 7 includes a relatively short gap (e.g., gap 751), such as may be on the order of 1 ms, between the slots of the uplink SPS first transmission block and the slots of the downlink SPS first transmission block. As discussed above, gap 751 may be utilized for a base station and some IIoT devices (e.g., sensors/actuators and corresponding industrial controllers for which the scheduling is provided) in communication therewith to switch between sending and listening modes.

PDCCH-based subframe 702 of the illustrated example includes PDCCH-scheduled resources (e.g., PUSCH slots 711 of the uplink PDCCH retransmission block) for uplink retransmissions and corresponding PDCCH-scheduled resources (e.g., PDSCH slots 721 of the downlink PDCCH retransmission block) for downlink retransmissions. In accordance with some aspects of the disclosure, the uplink PDCCH-scheduled resources are adjacent, or otherwise in close temporal proximity to, the downlink PDCCH-scheduled resources, such as to minimize delays introduced by the retransmission of data via the multi-hop communication link. For example, the example illustrated in FIG. 7 includes a relatively short gap (e.g., gap 751), such as may be on the order of 1 ms, between the slots of the uplink PDCCH retransmission block and the slots of the downlink PDCCH retransmission block. As discussed above, gap 751 may be utilized for a base station and some IIoT devices (e.g., sensors/actuators and corresponding industrial controllers for which the scheduling is provided) in communication therewith to switch between sending and listening modes.

In operation according to embodiments, if both an uplink SPS-scheduled first transmission and corresponding downlink SPS-scheduled first transmission of SPS-based subframe 701 are successful, then retransmission of that data using PDCCH-scheduled retransmissions of PDCCH-based subframe 702 may not be implemented. However, if an uplink SPS-scheduled first transmission of SPS-based subframe 701 fails (e.g., base station 105f of FIG. 4 aiding in the multi-hop communication link fails to receive or properly decode a packet of an uplink SPS-scheduled first transmission), then the base station aiding in the multi-hop communication link may send a U-message using the corresponding downlink SPS-scheduled first transmission resources of SPS-based subframe 701. For example, an instance of a PUSCH slots 711 of the uplink SPS first transmission block may not be received, or cannot be decoded, by a base station (e.g., base station 105f of FIG. 4) aiding in the multi-hop communication link, and thus the uplink SPS-scheduled first transmission fails. Failure of an uplink SPS-scheduled first transmission of SPS-based subframe 701 is illustrated in FIG. 7 by an instance of PUSCH slots 711 of the uplink SPS first transmission block demarcated with an "X". Transmission of a U-message using a corresponding downlink SPS-scheduled first transmission of SPS-based subframe 701 is illustrated in FIG. 7 by an instance of PDSCH slots 721 of the downlink SPS first transmission block demarcated with a "U".

A receiver (e.g., one of UE 115n, UE 115f, or UE 115m of FIG. 4) expecting a SPS-scheduled first transmission may thus receive the U-message (e.g., rather than receiving no transmission in the SPS-scheduled slot) and determine that the channel between the receiver and the base station remains viable (e.g., an assumption regarding channel error may be avoided). Additionally or alternatively, a receiver expecting a SPS-scheduled first transmission and receiving the U-message may perform channel estimation based upon the received U-message. For example, the receiver may decode the U-message and use a decoded predetermined message therein for channel estimation and/or other estimation processes.

A U-message of embodiments may provide a "filler" message in a SPS-scheduled slot or other resource, but does not provide the data payload of the failed uplink SPS-scheduled first transmission. Accordingly, embodiments of a SPS and control channel scheduled retransmission technique provide for scheduling retransmission of the data. For example, if an uplink SPS-scheduled first transmission of SPS-based subframe 701 fails, then a base station aiding in the multi-hop communication link may schedule resources of both of the uplink PDCCH retransmission block for uplink retransmission of the data and corresponding resources of the downlink PDCCH retransmission block for downlink retransmission of the data. For example, a base station (e.g., base station 105f of FIG. 4) aiding in the multi-hop communication link may use PDCCH resources (e.g., PDCCH slot 731 in the downlink SPS first transmission block for scheduling uplink retransmission and PDCCH slot 731 in the downlink PDCCH retransmission block for scheduling downlink retransmission) to coordinate PDCCH-scheduled retransmission between a transmitter (e.g., a transmitting one of one of UE 115n, UE 115f, or UE 115m of FIG. 4) to the base station and from the base station to a receiver (e.g., a receiving one of UE 115n, UE 115f, or UE 115m of FIG. 4) in a multi-hop communication link. Similarly, if an uplink SPS-scheduled first transmission of SPS-based subframe 701 is successful but a corresponding downlink SPS-scheduled first transmission of SPS-based subframe 701 fails, then a base station (e.g., base station 105f of FIG. 4) aiding in the multi-hop communication link may schedule resources of the downlink PDCCH retransmission block for downlink retransmission of the data. For example, a base station (e.g., base station 105f of FIG. 4) aiding in the multi-hop communication link may use PDCCH resources (e.g., PDCCH slot 731 in the downlink PDCCH retransmission block for scheduling downlink retransmission) to coordinate PDCCH-scheduled retransmission from the base station to a receiver (e.g., a receiving one of UE 115n, UE 115f, or UE 115m of FIG. 4) in a multi-hop communication link.

The above mentioned successful and/or failed SPS-scheduled first transmissions may be determined using ACK/NACK feedback provided by the receivers (e.g., a receiving one of UE 115n, UE 115f, or UE 115m of FIG. 4) expecting a SPS-scheduled first transmission. For example, feedback of ACK/NACK messages may be provided in a PUCCH. In operation according to some embodiments PUCCH resources (e.g., PUCCH slot 741 shown in the uplink PDCCH retransmission block of PDCCH-based subframe 702) of an instance of SPS and control channel scheduled frame 700 may be used for PDCCH-based scheduling of retransmission resources in a subsequent (e.g., immediately following) instance of SPS and control channel scheduled frame 700.

If an uplink PDCCH-scheduled retransmission of PDCCH-based subframe 702 fails, then a base station (e.g., base station 105f of FIG. 4) aiding in the multi-hop communication link may further send a U-message using the corresponding downlink PDCCH-scheduled retransmission resources of PDCCH-based subframe 702. For example, an instance of a PUSCH slots 711 of the uplink PDCCH retransmission block may not be received, or cannot be decoded, by a base station (e.g., base station 105f of FIG. 4) aiding in the multi-hop communication link, and thus the uplink PDCCH-scheduled retransmission fails. A receiver (e.g., one of UE 115n, UE 115f, or UE 115m of FIG. 4) expecting a PDCCH-scheduled retransmission may thus receive the U-message and utilized the U-message as described above. A base station (e.g., base station 105f of FIG. 4) aiding in the multi-hop communication link may use PDCCH resources (e.g., PDCCH slot 731) to again coordinate PDCCH-scheduled retransmission between a transmitter (e.g., a transmitting one of one of UE 115n, UE 115f, or UE 115m of FIG. 4) and a receiver (e.g., a receiving one of UE 115n, UE 115f, or UE 115m of FIG. 4) in a multi-hop communication link.

Figures 8, 9:
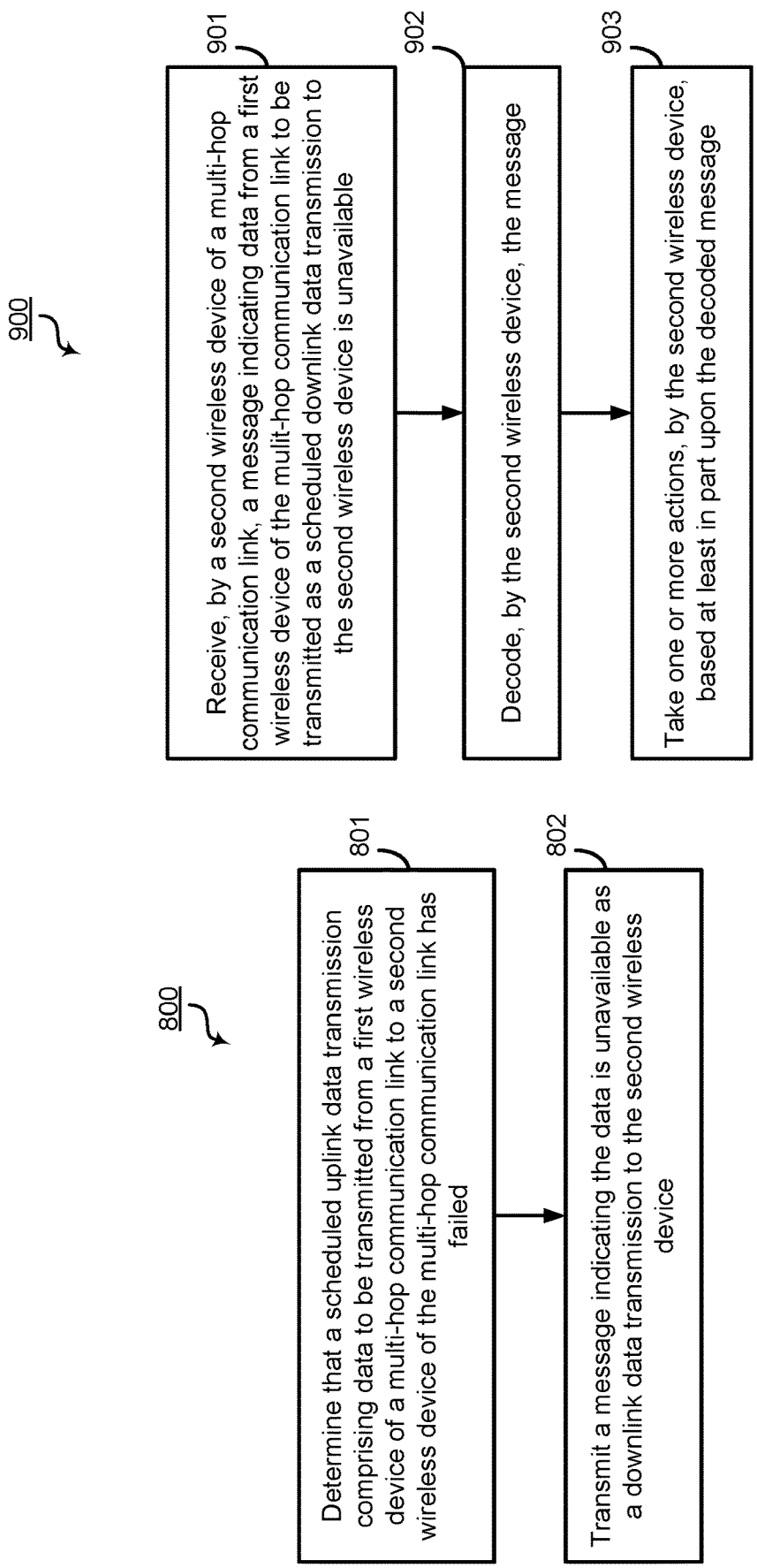
FIGS. 8 and 9 show flow diagrams of operation providing signaling of unavailable packets with respect to multi-hop communication links according to some embodiments of the present disclosure.

FIGS. 8 and 9 show flow diagrams of operation providing signaling of unavailable packets with respect to multi-hop communication links according to aspects of the present disclosure. The functions of flow 800 shown in FIG. 8, for example, may be performed by a base station (e.g., one or more of base stations 105 of FIG. 1, such as base station 105f of FIG. 4) aiding in a multi-hop communication link. Correspondingly, the functions of flow 900 shown in FIG. 9 may be performed by a UE (e.g., one or more of UEs 115 of FIG. 1, such as UEs 115*f*, 115*m*, and 115*n* of FIG. 4).

Referring first to FIG. 8, at block 801, a determination may be made that a scheduled uplink data transmission comprising data to be transmitted from a first wireless device of a multi-hop communication link to a second wireless device of the multi-hop communication link has failed. For example, logic (e.g., logic implemented by program code, as may be stored in one or more memories such as memory 242, executed by one or more controller/processors, such as controller/processor 240) of a base station (e.g., base station 105*f* of FIG. 4) may analyze an uplink of the multi-hop communication link to determine if a scheduled data transmission has been received, is decodable, etc. The scheduled data transmission may comprise an uplink data transmission from the first wireless device corresponding to a downlink data transmission scheduled for the second wireless device.

In operation according to embodiments, the scheduled uplink data transmission may comprise a SPS scheduled first transmission of the data. Alternatively, the scheduled uplink data transmission may comprise a control channel scheduled retransmission of the data.

At block 802, transmission of a message indicating that data is unavailable as a downlink data transmission may be made to the second wireless device. For example, wireless communication resources (e.g., one or more wireless radios, such as may comprise modulator/demodulators 232*a-t*, MIMO detector 236, receive processor 238, transmit processor 220, and TX MIMO processor 230, operating under control of one or more controller/processors, such as controller/processor 240) of a base station (e.g., base station 105*f* of FIG. 4) may be utilized to transmit a message, signaling an indication that a packet to be forwarded is currently unavailable in a multi-hop communication, to the second wireless device. The message may be transmitted using downlink resources scheduled for downlink transmission of the data from the failed scheduled uplink data transmission.

The message may, for example, be configured so as to be different from a set of other valid messages transmitted to the second wireless device. In accordance with some embodiments, the message is configured to avoid decoding ambiguity at the second wireless device as between messages signaling an indication that a packet to be forwarded is currently unavailable in a multi-hop communication and messages of the set of other valid messages. The message may comprise a message having predetermined content and format. For example, the message may comprise all-zero, all-one message content, or other predetermined message content and/or pattern.

Although not shown in the example of flow 800 of FIG. 8, retransmission of the data may be scheduled using control channel signaling to the first and second wireless devices. For example, wireless communication resources (e.g., one or more wireless radios, such as may comprise modulator/demodulators 254*a-r*, MIMO detector 256, receive processor 258, transmit processor 264, and TX MIMO processor 266, operating under control of one or more controller/processors, such as controller/processor 240) of a base station (e.g., base station 105*f* of FIG. 4) may be utilized to transmit control signals for scheduling retransmission of the data. Further, it may be determined that a scheduled uplink data retransmission, according to the control channel scheduling, from the first wireless device has failed. For example, logic (e.g., logic implemented by program code, as may be stored in one or more memories such as memory 242, executed by one or more controller/processors, such as controller/processor 240) of a base station (e.g., base station 105*f* of FIG. 4) may analyze an uplink of the multi-hop communication link to determine if a control channel scheduled data retransmission has been received, is decodable, etc. If the retransmission has not been received, a message signaling an indication that a packet to be forwarded is currently unavailable in a multi-hop communication may be transmitted as a downlink data transmission to the second wireless device. For example, wireless communication resources (e.g., one or more wireless radios, such as may comprise modulator/demodulators 254*a-r*, MIMO detector 256, receive processor 258, transmit processor 264, and TX MIMO processor 266, operating under control of one or more controller/processors, such as controller/processor 240) of a base station (e.g., base station 105*f* of FIG. 4) may be utilized to transmit the message using a control channel scheduled downlink transmission corresponding to the control channel scheduled uplink transmission.

Referring now to FIG. 9, at block 901, a message, indicating data from a first wireless device of a multi-hop communication link to be transmitted as a scheduled downlink data transmission to a second wireless device is unavailable, may be received by the second wireless device. For example, wireless communication resources (e.g., one or more wireless radios, such as may comprise modulator/demodulators 254*a-r*, MIMO detector 256, receive processor 258, transmit processor 264, and TX MIMO processor 266, operating under control of one or more controller/processors, such as controller/processor 280) of a UE (e.g., one of UEs 115*f*, 115*m*, and 115*n* of FIG. 4 expecting a scheduled transmission) may be utilized to receive a message, signaling an indication that a packet to be forwarded is currently unavailable in a multi-hop communication, from a base station (e.g., base station 105*f* of FIG. 4) aiding in the multi-hop communication link.

As described above, the message may be configured so as to be different from a set of other valid messages transmitted to the second wireless device. The message may, for example, be configured to avoid decoding ambiguity at the second wireless device as between messages signaling an indication that a packet to be forwarded is currently unavailable in a multi-hop communication and messages of the set of other valid messages. The message may comprise a message having predetermined content and format (e.g., comprising all-zero, all-one message content, or other predetermined message content, having predetermined content in a particular portion of the message, such as a message body, field, etc.). In accordance with some aspects of the disclosure, a configuration of the message may be established at the second wireless device through RRC signaling.

At block 902, the message may be decoded by a second wireless device of the multi-hop communication link. For example, wireless communication resources (e.g., receive processor 258 operating under control of controller/processor 280) of a UE (e.g., one of UEs 115*f*, 115*m*, and 115*n* of FIG. 4 receiving the message) may be utilized to decode a message signaling an indication that a packet to be forwarded is currently unavailable in a multi-hop communication received in a downlink of the multi-hop communication link from a base station (e.g., base station 105*f* of FIG. 4) aiding in the multi-hop communication link. In operation according to embodiments, the message may be decoded to retrieve content (e.g., all-zero, all one message content, or other predetermined message content and/or pattern) of a predetermined message configuration.

One or more actions may be taken based at least in part upon the decoded message, at block 903. For example, logic (e.g., logic implemented by program code, as may be stored in one or more memories such as memory 282, executed by one or more controller/processors, such as controller/processor 280) of a UE one of UEs 115f, 115m, and 115n of FIG. 4 receiving the message) may analyze the decoded message to determine if the contents correspond to that of a predetermined message, signaling an indication that a packet to be forwarded is currently unavailable in a multi-hop communication, configuration. If so, the UE may determine that downlink error for the downlink of the multi-hop communication link is not a cause of the data being unavailable, and thus maintain a data rate for the downlink. As another example, logic (e.g., logic implemented by program code, as may be stored in one or more memories such as memory 282, executed by one or more controller/processors, such as controller/processor 280) of a UE one of UEs 115f, 115m, and 115n of FIG. 4 receiving the message may perform channel estimation for the downlink of the multi-hop communication link using the message.

Figure 10:
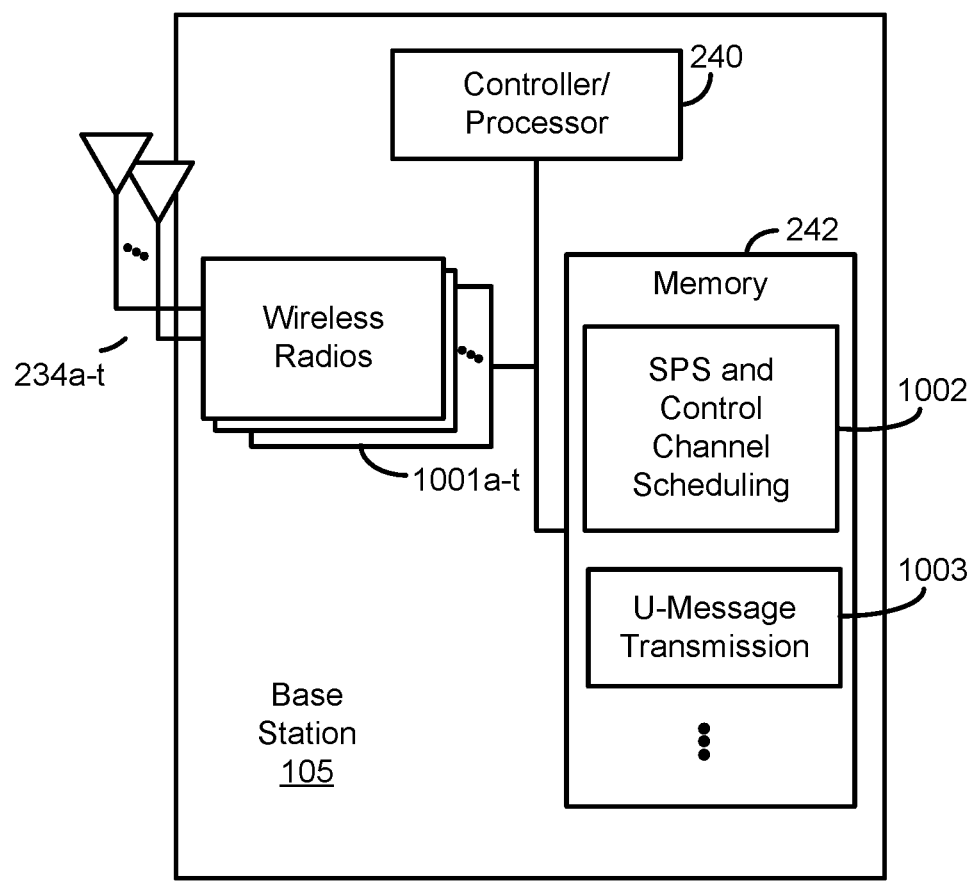
FIG. 10 is a block diagram conceptually illustrating a design of a base station configured to provide signaling of unavailable packets according to some embodiments of the present disclosure.

FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001a-t and antennas 234a-t. Wireless radios 1001a-t include various components and hardware, as illustrated in FIG. 2 for base station 105, including modulator/demodulators 232a-t, MIMO detector 236, receive processor 238, transmit processor 220, and TX MIMO processor 230.

Base station 105 of the example shown in FIG. 10 includes SPS and control channel scheduling logic 1002 and U-message transmission logic 1003 as may be utilized for performing functions as described herein. SPS and control channel scheduling logic 1002 and U-message transmission logic 1003 may, for example, comprise program code stored in memory 242 that is executed by controller/processor 240 for providing respective functionality. SPS and control channel scheduling logic 1002 may provide functionality including establishing SPS scheduled transmission of a first transmission of data with respect to various devices (e.g., IIoT devices, industrial controllers, etc.) utilizing a multi-hop communication link aided by base station 105, as described above. Additionally or alternatively, SPS and control channel scheduling logic 1002 may provide functionality including establishing control channel scheduled retransmission of data with respect to various devices (e.g., IIoT devices, industrial controllers, etc.) utilizing a multi-hop communication link aided by base station 105, as described above. U-message transmission logic 1003 may provide functionality including determining that a scheduled uplink data transmission of a multi-hop communication link aided by base station 105 has failed, as described above. Additionally or alternatively, U-message transmission logic 1003 may provide functionality including controlling transmission of U-messages as a downlink transmission to a wireless device of a multi-hop communication link aided by base station 105, as discussed above.

Figure 11:
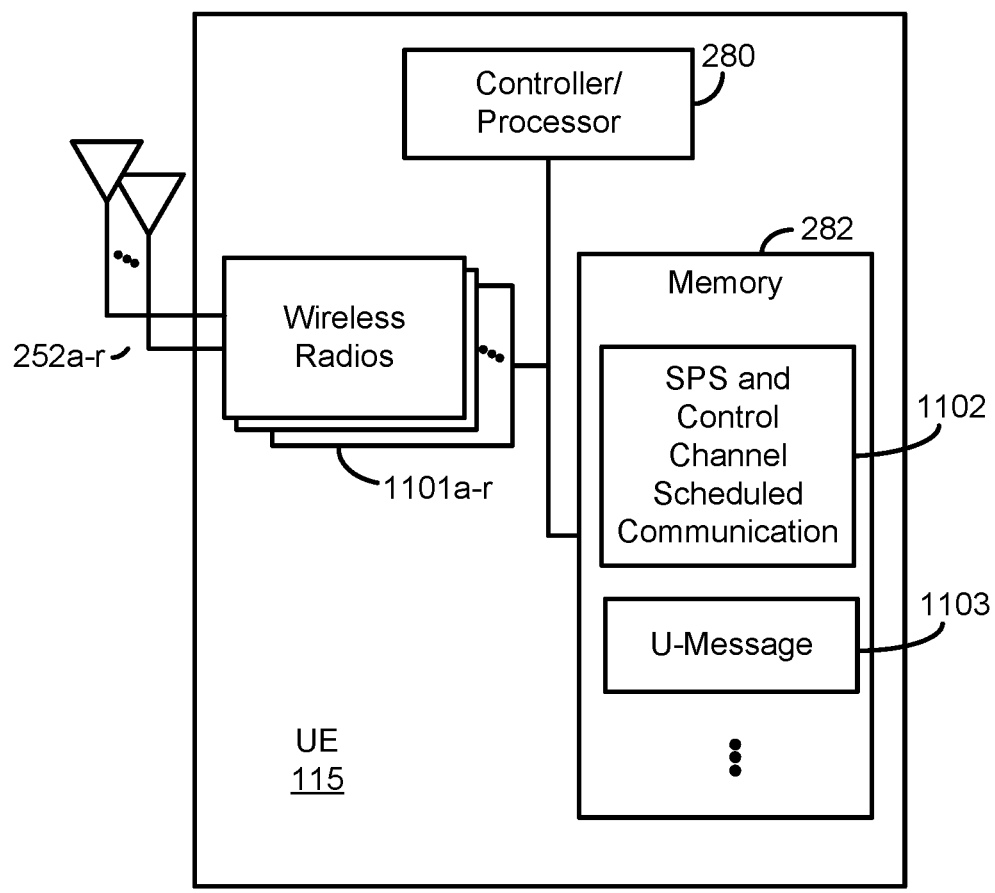
FIG. 11 is a block diagram conceptually illustrating a design of a UE configured to utilize signaling of unavailable packets according to some embodiments of the present disclosure.

FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1101a-r and antennas 252a-r. Wireless radios 1101a-r include various components and hardware, as illustrated in FIG. 2 for UE 115, including modulator/demodulators 254a-r, MIMO detector 256, receive processor 258, transmit processor 264, and TX MIMO processor 266.

UE 115 of the example shown in FIG. 11 includes SPS and control channel scheduled communication logic 1102 and U-message logic 1103. SPS and control channel scheduled communication logic 1102 and U-message logic 1103 may, for example, comprise program code stored in memory 282 that is executed by controller/processor 280 for providing respective functionality. SPS and control channel scheduled communication logic 1102 may provide functionality including configuring transmission and reception resources of UE 115 in accordance with SPS scheduling by a base station (e.g., base station 105 of FIG. 10) aiding in a multi-hop communication link, receiving and/or transmitting SPS-scheduled transmissions, etc., as described above. Additionally or alternatively, SPS and control channel scheduled communication logic 1102 may provide functionality including configuring transmission and reception resources of UE 115 in accordance with control channel scheduling by a base station (e.g., base station 105 of FIG. 10) aiding in a multi-hop communication link, receiving and/or transmitting control channel-scheduled transmissions, etc., as described above. U-message logic 1103 may provide functionality including controlling receiving and decoding U-messages from a base station (e.g., base station 105 of FIG. 10) aiding in a multi-hop communication link, as described above. Additionally or alternatively, U-message logic 1103 may provide functionality including controlling taking one or more actions by UE 115 based at least in part upon a decoded U-message received from a base station (e.g., base station 105 of FIG. 10) aiding in a multi-hop communication link, as discussed above.

In some examples of methods, apparatuses, and articles described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for determining that a scheduled uplink data transmission comprising data to be transmitted from a first wireless device of a multi-hop communication link to a second wireless device of the multi-hop communication link has failed, and transmitting a message indicating the data is unavailable as a downlink data transmission to the second wireless device.

2. The methods, apparatuses, and articles of clause 1, wherein the determining and the transmitting is performed by a base station.

3. The methods, apparatuses, and articles of any of clauses 1-2, wherein at least one of the first and second wireless devices comprise an IoT device.

4. The methods, apparatuses, and articles of any of clauses 1-3, wherein one of the first and second wireless devices comprises an IIoT device and the other one of the first and second wireless devices comprises an industrial controller, and wherein the industrial control and the IIoT device are part of an industrial environment control network.

5. The methods, apparatuses, and articles of any of clauses 1-4, wherein the message is transmitted using downlink resources scheduled for downlink transmission of the data from the failed scheduled uplink data transmission.

6. The methods, apparatuses, and articles of any of clauses 1-5, wherein the message is configured so as to be different from a set of other valid messages transmitted to the second wireless device.

7. The methods, apparatuses, and articles of any of clauses 1-6, wherein the message is configured to avoid decoding ambiguity at the second wireless device.

8. The methods, apparatuses, and articles of any of clauses 1-7, wherein the message comprises a message having predetermined content and format.

9. The methods, apparatuses, and articles of any of clauses 1-8, wherein a configuration of the message is established at the second wireless device through RRC signaling.

10. The methods, apparatuses, and articles of any of clauses 1-9, wherein the scheduled uplink data transmission comprises a SPS scheduled uplink transmission.

11. The methods, apparatuses, and articles of any of clauses 1-10, wherein the scheduled uplink data transmission comprises a first transmission of the data by the first wireless device.

12. The methods, apparatuses, and articles of clause 10, wherein the message is transmitted using a SPS scheduled downlink transmission corresponding to the SPS scheduled uplink transmission.

13. The methods, apparatuses, and articles of any of clauses 1-9, wherein the scheduled uplink data transmission comprises a control channel scheduled uplink transmission.

14. The methods, apparatuses, and articles of clause 13, wherein the control channel comprise a PDCCH.

15. The methods, apparatuses, and articles of any of clauses 13-14, wherein the scheduled uplink data transmission comprises a retransmission of the data by the first wireless device, wherein a first transmission of the data using a SPS scheduled uplink transmission by the first wireless device was determined to have failed and a message was transmitted to the second wireless device indicating the data of the SPS scheduled uplink transmission was unavailable.

16. The methods, apparatuses, and articles of any of clauses 13-15, wherein the message is transmitted using a control channel scheduled downlink transmission corresponding to the control channel scheduled uplink transmission.

17. The methods, apparatuses, and articles of any of clauses 1-16, further comprising:
scheduling retransmission of the data using control channel signaling to the first and second wireless devices.

18. The methods, apparatuses, and articles of clause 17, wherein the control channel comprises a PDCCH.

19. The methods, apparatuses, and articles of any of clauses 17-18, further providing for determining that a scheduled uplink data retransmission, according to the control channel scheduling, from the first wireless device has failed, and transmitting a second message as a downlink data transmission to the second wireless device, wherein the second message is transmitted using a control channel scheduled downlink transmission corresponding to the control channel scheduled uplink transmission.

20. Methods, apparatuses, and articles for wireless communication may provide for receiving, by a second wireless device of a multi-hop communication link, a message indicating data from a first wireless device of the multi-hop communication link to be transmitted as a scheduled downlink data transmission to the second wireless device is unavailable, decoding, by the second wireless device, the message, and taking one or more actions, by the second wireless device, based at least in part upon the decoded message.

21. The methods, apparatuses, and articles of clause 20, wherein the message is received from a base station.

22. The methods, apparatuses, and articles of any of clauses 20-21, wherein at least one of the first and second wireless devices comprise an IoT device.

23. The methods, apparatuses, and articles of any of clauses 20-22, wherein one of the first and second wireless devices comprises an IIoT device and the other one of the first and second wireless devices comprises an industrial controller, and wherein the industrial control and the IIoT device are part of an industrial environment control network.

24. The methods, apparatuses, and articles of any of clauses 20-23, wherein the message is received using downlink resources scheduled for downlink transmission of the data corresponding to a scheduled uplink data transmission that failed.

25. The methods, apparatuses, and articles of any of clauses 20-24, wherein the message is configured so as to be different from a set of other valid messages received by the second wireless device.

26. The methods, apparatuses, and articles of any of clauses 20-25, wherein the message is configured to avoid decoding ambiguity by the second wireless device.

27. The methods, apparatuses, and articles of any of clauses 20-26, wherein the message comprises a message having predetermined content and format.

28. The methods, apparatuses, and articles of any of clauses 20-27, wherein a configuration of the message is established at the second wireless device through RRC signaling.

29. The methods, apparatuses, and articles of any of clauses 20-28, wherein the taking one or more actions based at least in part upon the message provides for determining that downlink error for a downlink of the multi-hop communication link is not a cause of the data being unavailable, and maintaining a data rate for the downlink.

30. The methods, apparatuses, and articles of any of clauses 20-29, wherein the taking one or more actions based at least in part upon the message provides for performing channel estimation for a downlink of the multi-hop communication link using the message.

31. The methods, apparatuses, and articles of any of clauses 20-30, wherein the scheduled downlink data transmission comprises a SPS scheduled downlink transmission.

32. The methods, apparatuses, and articles of any of clauses 20-31, wherein a scheduled uplink data transmission corresponding to the scheduled downlink data transmission comprises a first transmission of the data by the first wireless device.

33. The methods, apparatuses, and articles of clause 31, wherein the message is transmitted using the SPS scheduled downlink transmission corresponding to a SPS scheduled uplink transmission for transmission of the data from the first wireless device.

34. The methods, apparatuses, and articles of an of clauses 20-31, wherein the scheduled downlink data transmission comprises a control channel scheduled downlink transmission.

35. The methods, apparatuses, and articles of clause 34, wherein the control channel comprise a PDCCH.

36. The methods, apparatuses, and articles of any of clauses 34-35, wherein a scheduled uplink data transmission corresponding to the scheduled downlink data transmission comprises a retransmission of the data by the first wireless device, wherein a first transmission of the data using a SPS scheduled uplink transmission by the first wireless device failed and a first message was received by the second wireless device indicating the data of the SPS scheduled uplink transmission was unavailable.

37. The methods, apparatuses, and articles of any of clauses 34-36, wherein the message is received using the control channel scheduled downlink transmission corresponding to a control channel scheduled uplink transmission from the first wireless device.

38. The methods, apparatuses, and articles of any of clauses 20-37, further providing for receiving control channel signaling comprising scheduling information for retransmission of the data.

39. The methods, apparatuses, and articles of clause 38, wherein the control channel comprises a PDCCH.

40. The methods, apparatuses, and articles of any of clauses 38-39, further providing for receiving, by the second wireless device, a second message as a downlink data transmission using a control channel scheduled downlink transmission corresponding to a control channel scheduled uplink transmission of a scheduled uplink data retransmission of the data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to SPS and control channel scheduled communications and signaling unavailable packets with respect to multi-hop communication links may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 8 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
determining that a scheduled uplink data transmission comprising data to be transmitted from a first wireless device of a multi-hop communication link to a second wireless device of the multi-hop communication link has failed;
transmitting a message indicating the data is unavailable as a downlink data transmission to the second wireless device, and
wherein the message is transmitted using downlink resources scheduled for downlink transmission of the data from the failed scheduled uplink data transmission.

2. The method of claim 1, wherein the message is configured so as to be different from a set of other valid messages transmitted to the second wireless device.

3. The method of claim 1, wherein the message is configured to avoid decoding ambiguity at the second wireless device.

4. The method of claim 1, wherein the message comprises a message having predetermined content and format, and wherein a configuration of the message is established at the second wireless device through radio resource control (RRC) signaling.

5. The method of claim 1, wherein the scheduled uplink data transmission comprises a semi-persistent scheduling (SPS) scheduled uplink transmission, and wherein the message is transmitted using a SPS scheduled downlink transmission corresponding to the SPS scheduled uplink transmission.

6. The method of claim 1, wherein the scheduled uplink data transmission comprises a control channel scheduled uplink transmission, wherein the message is transmitted using a control channel scheduled downlink transmission corresponding to the control channel scheduled uplink transmission, wherein the scheduled uplink data transmission comprises a retransmission of the data by the first wireless device, and wherein a first transmission of the data using a semi-persistent scheduling (SPS) scheduled uplink transmission by the first wireless device was determined to have failed and a message was transmitted to the second wireless device indicating the data of the SPS scheduled uplink transmission was unavailable.

7. The method of claim 1, further comprising:
scheduling retransmission of the data using control channel signaling to the first and second wireless devices;
determining that a scheduled uplink data retransmission, according to the control channel scheduling, from the first wireless device has failed; and
transmitting a second message as a downlink data transmission to the second wireless device, wherein the second message is transmitted using a control channel scheduled downlink transmission corresponding to the control channel scheduled uplink transmission.

8. A method of wireless communication, comprising:
receiving, by a second wireless device of a multi-hop communication link, a message indicating data from a first wireless device of the multi-hop communication link to be transmitted as a scheduled downlink data transmission to the second wireless device is unavailable;
decoding, by the second wireless device, the message;
taking one or more actions, by the second wireless device, based at least in part upon the decoded message, and
wherein the message is received using downlink resources scheduled for downlink transmission of the data corresponding to a scheduled uplink data transmission that failed.

9. The method of claim 8, wherein the message is configured so as to be different from a set of other valid messages received by the second wireless device.

10. The method of claim 8, wherein the message is configured to avoid decoding ambiguity by the second wireless device.

11. The method of claim 8, wherein the message comprises a message having predetermined content and format, and wherein a configuration of the message is established at the second wireless device through radio resource control (RRC) signaling.

12. The method of claim 8, wherein the taking one or more actions based at least in part upon the message comprises:
determining that downlink error for a downlink of the multi-hop communication link is not a cause of the data being unavailable; and
maintaining a data rate for the downlink.

13. The method of claim 8, wherein the taking one or more actions based at least in part upon the message comprises:
performing channel estimation for a downlink of the multi-hop communication link using the message.

14. The method of claim 8, wherein the scheduled downlink data transmission comprises a semi-persistent scheduling (SPS) scheduled downlink transmission, and wherein the message is transmitted using the SPS scheduled downlink transmission corresponding to a SPS scheduled uplink transmission for transmission of the data from the first wireless device.

15. The method of claim 8, wherein the scheduled downlink data transmission comprises a control channel scheduled downlink transmission, wherein the message is received using the control channel scheduled downlink transmission corresponding to a control channel scheduled uplink transmission from the first wireless device, wherein a scheduled uplink data transmission corresponding to the scheduled downlink data transmission comprises a retransmission of the data by the first wireless device, and wherein a first transmission of the data using a semi-persistent scheduling (SPS) scheduled uplink transmission by the first wireless device failed and a first message was received by the second wireless device indicating the data of the SPS scheduled uplink transmission was unavailable.

16. The method of claim 8, further comprising:
receiving control channel signaling comprising scheduling information for retransmission of the data; and
receiving, by the second wireless device, a second message as a downlink data transmission using a control channel scheduled downlink transmission corresponding to a control channel scheduled uplink transmission of a scheduled uplink data retransmission of the data.

17. An apparatus configured for wireless communication, the apparatus comprising:
a memory; and
at least one processor coupled to the memory, wherein the at least one processor is configured to:
determine that a scheduled uplink data transmission comprising data to be transmitted from a first wireless device of a multi-hop communication link to a second wireless device of the multi-hop communication link has failed;
transmit a message indicating the data is unavailable as a downlink data transmission to the second wireless device, and
wherein the message is transmitted using downlink resource scheduled for downlink transmission of the data from the failed scheduled uplink data transmission.

18. The apparatus of claim 17, wherein the scheduled uplink data transmission comprises a semi-persistent scheduling (SPS) scheduled uplink transmission, and wherein the message is transmitted using a SPS scheduled downlink transmission corresponding to the SPS scheduled uplink transmission.

19. The apparatus of claim 17, wherein the scheduled uplink data transmission comprises a control channel scheduled uplink transmission, wherein the message is transmitted using a control channel scheduled downlink transmission corresponding to the control channel scheduled uplink transmission, wherein the scheduled uplink data transmission comprises a retransmission of the data by the first wireless device, and wherein a first transmission of the data using a semi-persistent scheduling (SPS) scheduled uplink transmission by the first wireless device was determined to have failed and a message was transmitted to the second wireless device indicating the data of the SPS scheduled uplink transmission was unavailable.

20. The apparatus of claim 17, wherein the at least one processor is configured to:
schedule retransmission of the data using control channel signaling to the first and second wireless devices;
determine that a scheduled uplink data retransmission, according to the control channel scheduling, from the first wireless device has failed; and
transmit a second message as a downlink data transmission to the second wireless device, wherein the second message is transmitted using a control channel scheduled downlink transmission corresponding to the control channel scheduled uplink transmission.

21. An apparatus configured for wireless communication, the apparatus comprising:
a memory; and
at least one processor coupled to the memory, wherein the at least one processor is configured to:
receive, by a second wireless device of a multi-hop communication link, a message indicating data from a first wireless device of the multi-hop communication link to be transmitted as a scheduled downlink data transmission to the second wireless device is unavailable;
decode, by the second wireless device, the message;
take one or more actions, by the second wireless device, based at least in part upon the decoded message, and
wherein the message is received using downlink resources scheduled for downlink transmission of the data corresponding to a scheduled uplink data transmission that failed.

22. The apparatus of claim 21, wherein the taking one or more actions based at least in part upon the message comprises:
determining that downlink error for a downlink of the multi-hop communication link is not a cause of the data being unavailable; and
maintaining a data rate for the downlink.

23. The apparatus of claim 21, wherein the taking one or more actions based at least in part upon the message comprises:
performing channel estimation for a downlink of the multi-hop communication link using the message.

24. The apparatus of claim 21, wherein the scheduled downlink data transmission comprises a semi-persistent scheduling (SPS) scheduled downlink transmission, and wherein the message is transmitted using the SPS scheduled downlink transmission corresponding to a SPS scheduled uplink transmission for transmission of the data from the first wireless device.

25. The apparatus of claim 21, wherein the scheduled downlink data transmission comprises a control channel scheduled downlink transmission, wherein the message is received using the control channel scheduled downlink transmission corresponding to a control channel scheduled uplink transmission from the first wireless device, wherein a scheduled uplink data transmission corresponding to the scheduled downlink data transmission comprises a retransmission of the data by the first wireless device, and wherein a first transmission of the data using a semi-persistent scheduling (SPS) scheduled uplink transmission by the first wireless device failed and a first message was received by the second wireless device indicating the data of the SPS scheduled uplink transmission was unavailable.

26. The apparatus of claim 21, further comprising:
receiving control channel signaling comprising scheduling information for retransmission of the data; and
receiving, by the second wireless device, a second message as a downlink data transmission using a control channel scheduled downlink transmission corresponding to a control channel scheduled uplink transmission of a scheduled uplink data retransmission of the data.

* * * * *